Jan. 25, 1944.  H. J. MURPHY  2,340,250
ROTARY STUD FASTENER INSTALLATION
Filed July 16, 1942
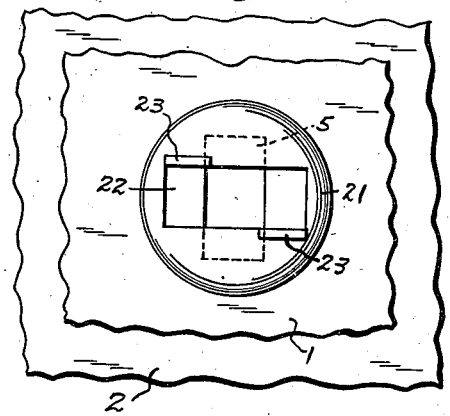
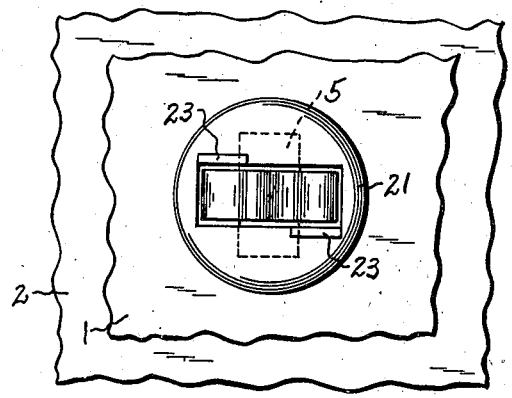
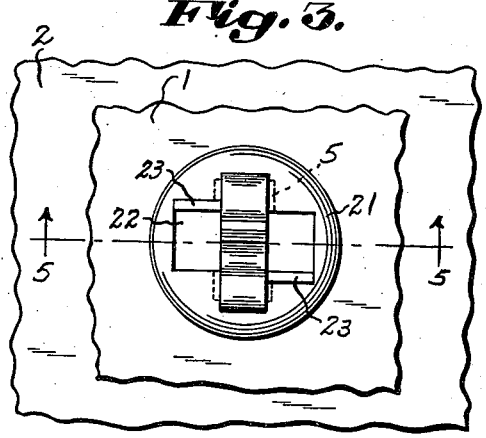
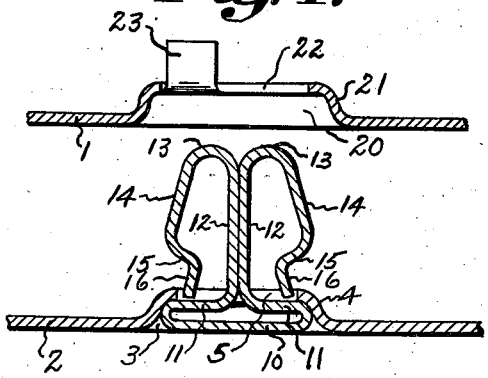
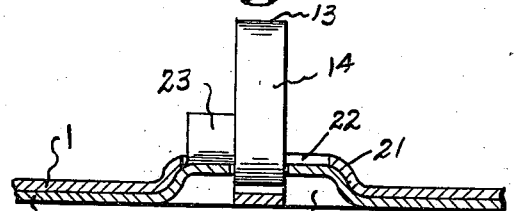
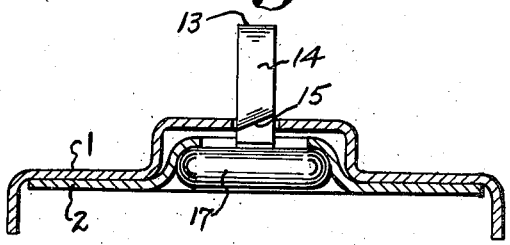
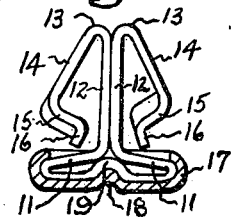
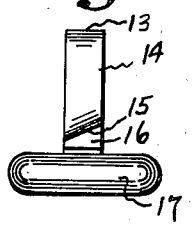
Inventor:
Howard J. Murphy.
By Walter J. Jones
Atty.

Patented Jan. 25, 1944

2,340,250

UNITED STATES PATENT OFFICE 2,340,250

ROTARY STUD FASTENER INSTALLATION

Howard J. Murphy, Greenwood, Mass., assignor to United-Carr Fastener Corporation, Cambridge, Mass., a corporation of Massachusetts Application July 16, 1942, Serial No. 451,126

1 Claim. (Cl. 24—221)

The present invention relates to fastener secured installations as well as the rotary stud fastener therefor and aims generally to improve and simplify the construction of the installation as well as the rotary stud fastener.

Heretofore, such fastener secured installations and rotary stud fastener used for securing two sheet metal plates together, as for example airplane cowling, have required a separate female fastener member attached to the inner face of the supporting panel. This has required punching the supporting panel and fastening the female fastening member thereto as by rivets prior to assembly of the sheets and fastener.

Furthermore, the rotary stud member, which frequently has been a specially milled or a screw machine made part, was usually rotatably fitted to the supported panel prior to assembly and frequently required special tools or machines for effecting such fitting.

My invention aims to improve existing installations of this type by eliminating the necessity of a separately formed and attached female fastening member, thus eliminating much of the expense and time required for constructing the installation.

A further aim and object of the invention is to improve the construction of the rotary stud member to eliminate slow and expensive machining operations and the necessity of special tools or machinery for mounting the stud member in the supported part.

Illustrative of my invention, reference is made to the accompanying drawing wherein two embodiments of the invention are shown, and wherein Fig. 1 is a plan viewed from the inner member showing the preferred relative position of the parts prior to the application of the stud fastener;

Fig. 2 is a similar view with the stud shown inserted in the inner member but not locked thereto;

Fig. 3 is a similar view with the stud in locked position;

Fig. 4 is a sectional view taken on the line 4—4 of Fig. 2 with the parts of the fastening in their unlocked position;

Fig. 5 is a sectional view taken on the line 5—5 of Fig. 3 with the parts of the fastening locked;

Fig. 6 is a similar view of a modified form of fastening;

Fig. 7 is an edge elevation of a stud member according to one form of the invention; and Fig. 8 is a side elevation thereof.

Referring to the drawing, the improved fastener of my invention is primarily, though not necessarily, designed for securing two metal sheets, such as cowling sheets, in flush-tight relationship. Such sheets, for convenience, are herein designated as a supporting part 1 and a supported part 2, though it will be understood that the part 2 may be the support and the part 1 the supported part.

The supported part 2 is preferably provided with a stud-receiving recess 3 formed in any suitable manner, as by shaping the material of the supported member 2 in an annular boss 4, the base of which is provided with an elongated aperture 5, adapted to receive the shank of a stud member rotatably mounted therein.

The rotary stud member, according to the invention, is of novel construction and is preferably formed of a heat-treated ribbon of steel bent to provide an elongated flattened looped base 10 formed from the central portion of the ribbon. The reversely bent portions 11 of the base are bent angularly and extend away from the base 10 in contact with each other, forming relatively rigid web portions 12. The web portions 12 are reversely bent in opposite directions to form the head of the stud with rounded noses 13. They then extend in a divergent direction to the web portions a certain distance, forming divergent or tapering surfaces 14 spaced from the base. The end portions of the ribbon then extend inwardly, providing convergent shoulders 15, and the extremity of the ribbon may be parallel to the web portions 12, forming a reduced shank 16.

The stud member thus formed is characterized in that it has a base with a relatively rigid web portion extending therefrom and a head comprising laterally yielding divergent cams and convergent shoulders connected to the web portions by rounded nose portions. The width of the stud, as measured between the opposed junctures of the divergent cam portions 14 and the convergent shoulders 15, preferably is substantially greater than its thickness and is slightly greater than the length of the slot 5, so that the stud may be loosely retained in the slot 5 of the member 2. Insertion of the stud in the slot is, however, readily accomplished due to the lateral resiliency of the cams 14.

The base 10 of the stud may, if desired, be encased within a cap member 17 and securely fastened thereto, as shown in Fig. 7, and the cap may be provided with a transverse groove 18 fitted within a groove 19 of the base 10 for the reception of a bladed tool, as for example a screw driver, for turning the stud in the member 2. Furthermore, the shoulders 15 as well as the terminal ends forming the shank 16 may be angularly inclined in opposite directions with reference to the planes of the divergent cam portions 14 to provide cams to facilitate rotation of the stud in the opening 5, as shown in Figs. 6, 7 and 8.

The stud member above described when assembled with the member 2 is adapted to be engaged in an opening in the member 1 and locked thereto simply by rotation of the stud through an arc of approximately 90° and thus secure the parts 1 and 2 together in locked relationship.

The supporting member 1 is preferably formed with a recess 20 to receive the boss 4 of the member 2 so that the major portions of the plates or members 1 and 2 may be in flush-tight relationship.

In cases where the supporting member 1 is a relatively flat sheet or plate, the recess 20 may be formed by shaping the material of the sheet in an annular boss 21 of sufficient size to receive the boss 4, the base of which may be provided with an elongated slot 22 of sufficient length to receive the cam portions 14 of the rotary stud member. The width of the slot is substantially equal to or less than the width of the stud shank 16. Portions of the metal of the support 1 cut out to form the slot 22 may be bent angularly to the base of the boss 21 to provide spaced stop members 23 on opposite sides of the slot 21 to prevent rotation of the stud beyond its locked position.

In certain cases the support may be in the form of a channelled member 1ª, as illustrated in Fig. 6, in which case the channel portion provides means to receive the boss 4. In such case the elongated slot 22 is formed in the web of the channel.

The slots 5 and 22 in the members 2 and 1, respectively, may be so arranged as to be symmetrical when the parts 1 and 2 are in assembled relation, but preferably these elongated slots are arranged with their longitudinal axes at right angles to each other, so that when the plates are assembled a restricted rectangular opening is provided. This provides a more secure interlock between the members 1 and 2.

My improved fastener has the advantage of simplicity of construction, eliminating the necessity of a separate female fastening member, usually employed, which must be attached to the rear face of the support by rivets and the like. Furthermore, the construction of the stud member is such that it can be readily formed on bending machines much more quickly than other studs which require screw machine or milling operations.

Although I have illustrated and described preferred embodiments of my invention, I do not wish to be limited thereby because the scope of my invention is best defined by the following claim.

I claim:

In a rotary stud fastener secured installation, in a combination, a stud-carrying member having an aperture therein, a stud member rotatably mounted in said aperture and formed of a ribbon of metal bent to provide an elongated looped base, relatively rigid axial web portions extending from said base through said aperture, each of said web portions terminating in a nose portion merging into divergent cam portions, inwardly extending shoulder portions connected to each diverging cam portion, said shoulders being obliquely inclined with reference to the edge surface of said divergent cam portions, and terminal end portions extending from the inner ends of said shoulders and cooperating with said web portions to provide the shank of said stud.

HOWARD J. MURPHY.